Aug. 1, 1933.    K. MORSBACH    1,920,657
REEL FOR FILMS AND OTHER FLEXIBLE MATERIAL
Filed March 19, 1931
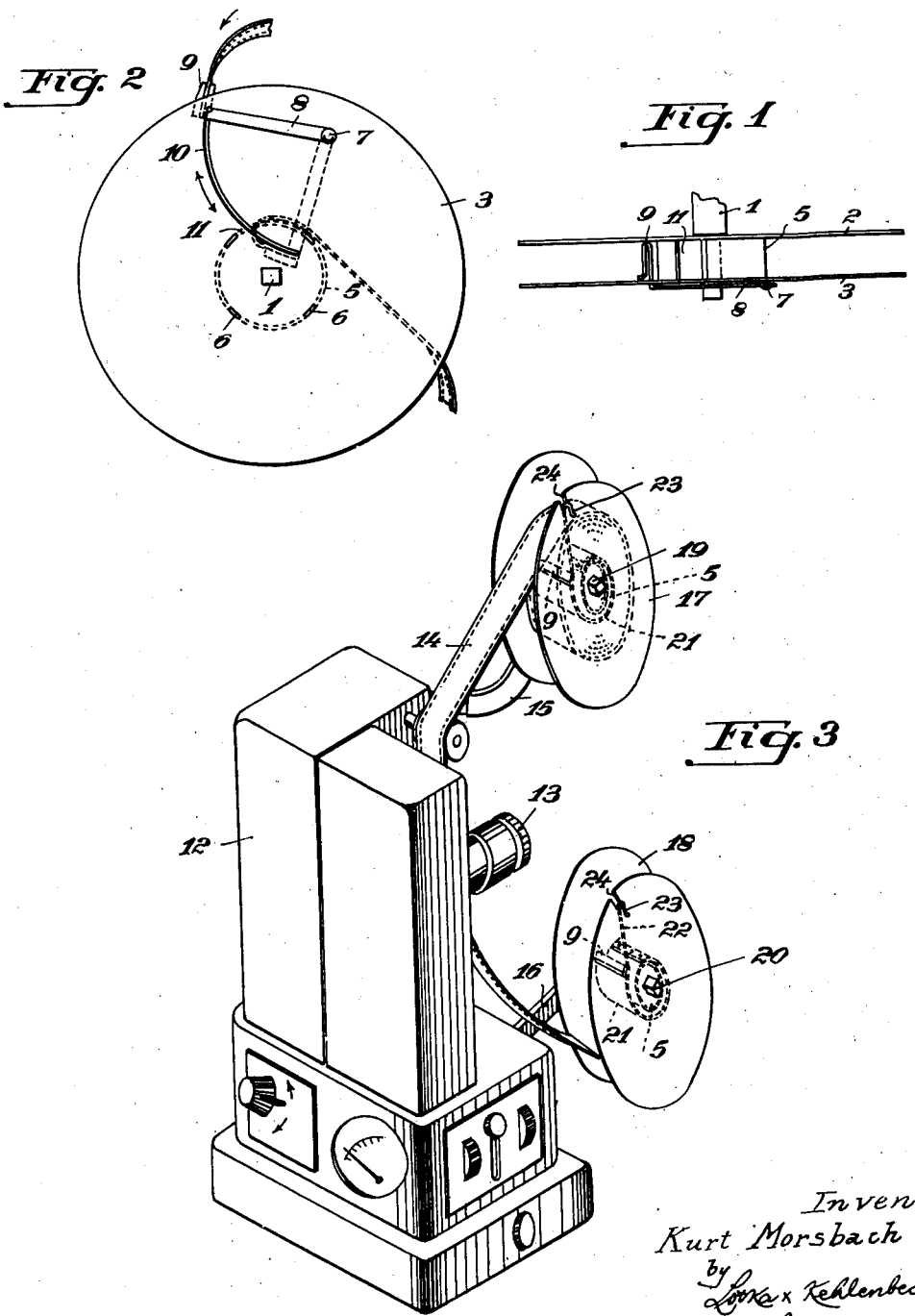
Inventor:
Kurt Morsbach
by Loxax Kehlenbeck
Attorneys.

Patented Aug. 1, 1933

1,920,657

UNITED STATES PATENT OFFICE 1,920,657

REEL FOR FILMS AND OTHER FLEXIBLE MATERIAL

Kurt Morsbach, Berlin-Grunewald, Germany, assignor to Projector G. m. b. H., Berlin, Germany, a Corporation of Germany Application March 19, 1931, Serial No. 523,698, and in Germany March 25, 1930

3 Claims. (Cl. 242—74)

When films or other webs or flexible strips are to be wound on reels, the leading end of the strip must be fastened in some way to the core of the reel so that rotation of the reel will take the strip along. For this purpose the reel core is generally provided with a slot, a leaf spring or the like to clamp or secure the leading end of the film. The threading of the film offers no particular difficulties as long as the length of the reel is large in comparison with its diameter. When, however, the reverse condition obtains, that is to say when the spool is very flat and has a large diameter, the threading of the strip offers considerable difficulties. In the case of reels for photographic films of the narrow type having for instance a width of 16 millimeters and a length of about 100 meters, it is not possible to reach the reel core from the periphery in order to thread the leading end of the film. In such cases the expedient resorted to heretofore has consisted in providing the disks of the reel in the neighborhood of the core with holes of a sufficient size to permit fingers to be introduced for fastening the leading end of the film to the core. There has also been proposed a clamping arrangement which can be operated from the outside of the spool by means of a lever; this indeed facilitates the opening of the clamping device, but in this case as in the one first referred to, difficulty is experienced in bringing the leading end of the film to the proper position for fastening it to the reel core. Another expedient which has been suggested for overcoming the difficulty mentioned, consists in the use of sectional reels in which one of the disks or ends is removable. This indeed facilitates threading of the film, but involves the danger of having the film drop out if the reel is held in the wrong position when opening it.

My present invention avoids the difficulties and drawbacks referred to above, by providing novel means which permit the fastening of the leading end of the film to be effected exteriorly of the reel core. This enables me to secure the film or strip in a very simple manner even in those cases where the diameter of the reel is very large as compared to its length. The construction may for instance be such that the reel is provided with a movable securing device for receiving the leading end of the film, such device having a slit or clamping spring for holding such leading end. When it is desired to thread the strip, this securing device is moved away from the reel core, into a position where it is readily accessible for threading the film or strip. For instance I might locate within the reel core a tape or strip of the same kind as used in measuring tapes or a coiled spring, the outer end of such tape or spring having a clamp for attaching the leading end of the strip or film thereto.

In the preferred embodiment of my invention, the clamp or securing device is located at the free end of a swinging arm. During the operation of the reel, this securing device would be within the core of the reel, but when it is desired to thread in the film, the securing device would be swung to the periphery of the reel so that the film end could be easily secured to the said device which is readily accessible in this position. This is of especial advantage in the case of very flat reels of large diameter such as used for instance for motion picture projectors employing narrow films. The movement of the securing device out of the reel core is effected not from a point between the reel disks, but from the exterior thereof.

In apparatus employing narrow films, the film reels are generally so constructed that, in order to compel proper insertion of the film, they can be introduced only from one side. For this purpose there is provided a square hole at one side of the reel and a round hole at the other side, or one of the disks is provided with a mark showing how the reel is to be set on its spindle. With my new reel construction, these particular provisions become unnecessary as according to a further feature of such invention, the arm carrying the securing device is operated from the side of the reel disk which in operative position is the outer disk. In this case the reel can be inserted only in such a position that the member operating the securing device will be directed toward the operator.

A typical and preferred embodiment of my invention is shown in the accompanying drawing, Fig. 1 being an edge view of the reel and its spindle, Fig. 2 a face view thereof, and Fig. 3 is a perspective view of a motion picture projector provided with my improved reel.

The reel is mounted on a spindle 1 and comprises heads or disks 2, 3 and a core 5 separating the said disks. This core consists of a piece of sheet metal bent to cylindrical shape and having lugs 6 riveted or otherwise secured to the disks 2, 3. Upon the disk 3 is mounted externally, to pivot about a pin 7, an arm or lever 8 provided at its free end with a securing device or clamp 9. As shown in Fig. 1, this device may be formed by a U-shaped bend in the end of the arm 8, said bend being located between the planes of the disks 2 and 3. If the U-shaped bend is made of elastic material, it will exert a clamping action on the end of the film which is pushed between the two members of said U-shaped bend. The disk 3 is provided with a slot 10 concentric with the pin 7 and permitting a portion of the arm 8 to extend freely through the disk 3 as said arm is swung on its pivot. The slot 10 is extended inwardly beyond the periphery of the core 5, and the latter is provided with a cut-out portion or opening 11 at a corresponding portion of its periphery, so that when the arm 8 is swung inwardly, the securing device 9 may be carried into the core 5 as indicated by dotted lines. The interior of the tubular core, together with the opening 11, constitutes a recess, open at the periphery of the core, into which the securing device 9 may be moved.

When it is desired to thread the film, the arm 8 is swung outwardly to the position shown in full lines in Fig. 2. In this position the securing device 9 is at the periphery of the reel and may even project therefrom as shown. It therefore is quite easy to fasten the leading end of the film to the securing device. The latter may clamp the leading end of the film or when the securing device has no clamping action, the leading end of the film may be bent or otherwise secured in position so that it will follow the arm 8 when the latter is subsequently swung inwardly to the position indicated by dotted lines. This brings the securing device 9 and the leading end of the film attached thereto, into the core 5 and upon then rotating the reel, the film or strip is wound thereon in the usual manner.

It will be understood that the securing device 9 is complete in itself, and does not require the co-operation of the core 5 or of other elements to hold the strip or film; the film can therefore be firmly attached to said securing device when the latter is in its outer position, near the periphery of the reel.

In Fig. 3 a motion-picture projector is shown ready for operation. The closed apparatus 12 with the objective 13, behind which the film 14 is passed along in the usual manner, carries on arms 15 and 16 the unwinding reel 17 and the winding-up reel 18 respectively. The reels are placed on the pins 19 and 20 mounted on the arms 15 and 16 in such a manner that the device for threading the film can be manipulated from the side where the operator stands.

The reels 17 and 18 mounted here show a further embodiment of my invention. To the core or hub 5 of each reel is secured a tape spring 21 which is coiled around said core in the manner of the spring of a clock and the free end of which is provided with a clamping arrangement 9 for attaching the leading end of the film thereto. To enable this clamping arrangement to be placed at the periphery of the reel, a thin wire 22 is attached to the end of the tape spring 21 and its free end is bent in the manner of a hook and hooked into a notch 24 at the periphery of the reel facing the operator. By grasping the hook 23 and pulling out the tape spring with the clamping arrangement, the end of the film may easily be attached or secured, the clamping arrangement placing itself automatically against the core of the reel again when the hook is released. The film may then be wound on in the direction of winding the tape spring on to the reel.

When applied to film reels, my invention has the advantage that the disks of such reels no longer require to be made with large holes. These holes which hitherto were necessary in order to insert the operator's fingers in threading the film, have the drawback that air is admitted abundantly to the coiled layers of the film, and that thereby the film will be caused to dry and become brittle. Since in my invention the threading of the film takes place at the periphery of the reel, that is to say from the outside of the reel, the large holes required hitherto are no longer necessary and the film is preserved in a better condition.

Various modifications may be made without departing from the nature of my invention as defined in the appended claims.

I claim:

1. A reel for flexible strips, comprising two disks, a hollow core connecting said disks and provided with a peripheral opening, a securing device for the leading end of the film, said securing device being movable between said disks and through said peripheral opening of the core into the interior thereof whereby said securing device may be brought either into the interior of the core or to a position at the periphery of the reel disks, and a pivoted arm carrying said securing device and located externally on one of said disks, this disk being provided with a slot concentric with the pivot of said arm and extending from the peripheral portion of such disk into registry with, and inwardly beyond, the peripheral opening of the core.

2. A reel for flexible strips, comprising two disks, a core connecting said disks and provided with a recess open at the periphery of the core, an arm located externally on one of said disks and pivoted about an axis parallel to the reel axis, said disk being provided with a slot concentric with the pivot of said arm and extending from the peripheral portion of such disk into registry with the recess of the core, said arm having a portion extending through said slot inwardly to the space between said disks, a strip-securing device connected with said portion of the pivoted arm and located between said disks to move between them and into said recess, whereby said securing device may be brought either inwardly into said recess or outwardly to a position at the periphery of the reel disks, said pivoted securing device being complete in itself so that the strip may be attached thereto while the said device is in its outer position.

3. A reel for flexible strips, comprising two disks, a core connecting said disks and provided with a recess open at the periphery of the core, a strip-securing device located and movable between said disks and pivoted about an axis parallel to the reel axis, one of said disks having a slot concentric with the pivot of said securing device and extending from the peripheral portion of such disk into registry with the recess of the core, and an external manipulating member connected with said device and projecting through said slot, whereby said securing device may be brought either inwardly into said recess or outwardly to a position at the periphery of the reel disks, said pivoted securing device being complete in itself so that the strip may be attached thereto while the said device is in its outer position.

KURT MORSBACH.